(12) United States Patent
Poiencot, Jr.

(10) Patent No.: US 6,571,505 B1
(45) Date of Patent: Jun. 3, 2003

(54) FISH HOLDER

(76) Inventor: Russell A. Poiencot, Jr., 4166 Bayouside Dr., Houma, LA (US) 70363

( * ) Notice: Subject to any disclaimer, the term of this patent is extended or adjusted under 35 U.S.C. 154(b) by 0 days.

(21) Appl. No.: 09/724,066

(22) Filed: Nov. 28, 2000

(51) Int. Cl.$^7$ ................................................ A01K 97/14
(52) U.S. Cl. .......................... 43/5; 119/806; 294/99.2; 294/100; 294/119.1
(58) Field of Search ..................... 43/5, 37; 56/333; 294/1.3, 1.4, 8.5, 19.1–19.3, 50.6, 87.26, 92, 99.2, 100, 119.1, 34; 119/806; 81/355, 487; D22/149–150; D8/4, 51

(56) References Cited

U.S. PATENT DOCUMENTS

| 405,001 | A | * | 6/1889 | Barton | 294/115 |
|---|---|---|---|---|---|
| 2,482,576 | A | * | 9/1949 | Comstock | 294/16 |
| 2,613,100 | A | * | 10/1952 | Casey, Jr. | 294/19.1 |
| 2,930,648 | A | | 3/1960 | Allan | 294/26 |
| 3,208,786 | A | | 9/1965 | Eddleman | 294/19 |
| 3,420,563 | A | * | 1/1969 | Witt | 294/16 |
| 3,833,252 | A | | 9/1974 | Redding | 294/110 A |
| 3,929,363 | A | * | 12/1975 | Kahan | 294/1.4 |
| 3,978,605 | A | | 9/1976 | Maruniak | 294/115 |
| 4,005,897 | A | * | 2/1977 | Smith | 294/115 |
| 4,623,184 | A | * | 11/1986 | Houston | 294/100 |
| 4,854,626 | A | | 8/1989 | Duke | 294/19.1 |
| 5,056,842 | A | * | 10/1991 | Lindenberg et al. | 294/1.4 |
| 5,156,428 | A | * | 10/1992 | Wright | 294/19.1 |
| 5,370,432 | A | * | 12/1994 | Kram | 294/19.1 |
| 5,407,243 | A | * | 4/1995 | Riemann | 294/100 |
| 5,501,382 | A | * | 3/1996 | Webb | 224/673 |
| 5,577,785 | A | | 11/1996 | Traber et al. | 294/19.1 |
| 5,601,321 | A | * | 2/1997 | Simon | 294/1.4 |
| 5,832,651 | A | | 11/1998 | Arntz | 294/19.3 |

FOREIGN PATENT DOCUMENTS

WO      WO 84/03200       8/1984

* cited by examiner

Primary Examiner—Charles T. Jordan
Assistant Examiner—Tara M Golba
(74) Attorney, Agent, or Firm—David L. Ray

(57) ABSTRACT

An apparatus for holding a fish including fish grasping tongs having jaws at he distal end thereof for placement on the inside and outside of the mouth of a fish, and a hollow case for slidably receiving the fish grasping tongs, the case being adapted to force the tongs to close together as the distal end of the tongs is drawn toward the case.

9 Claims, 4 Drawing Sheets

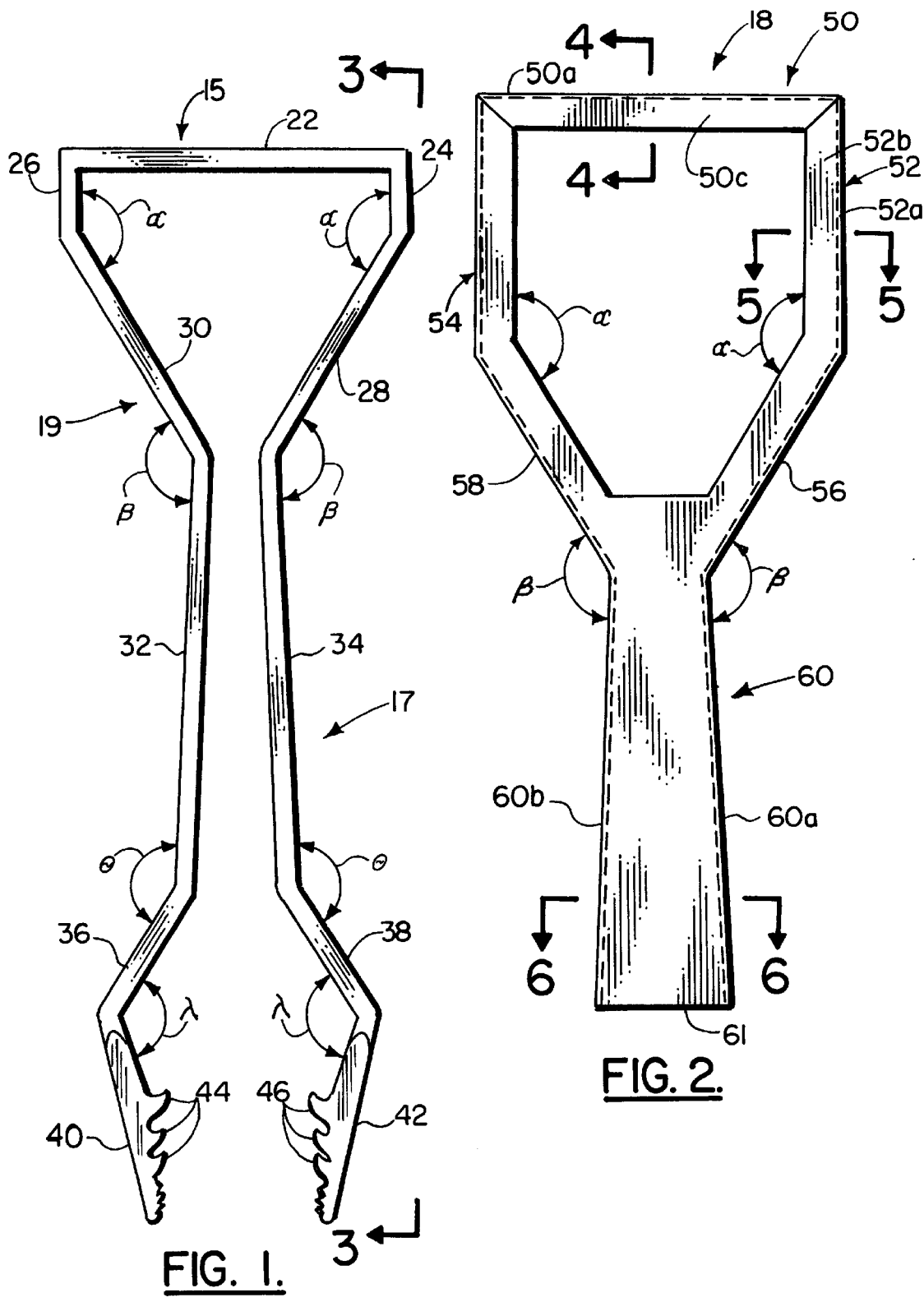

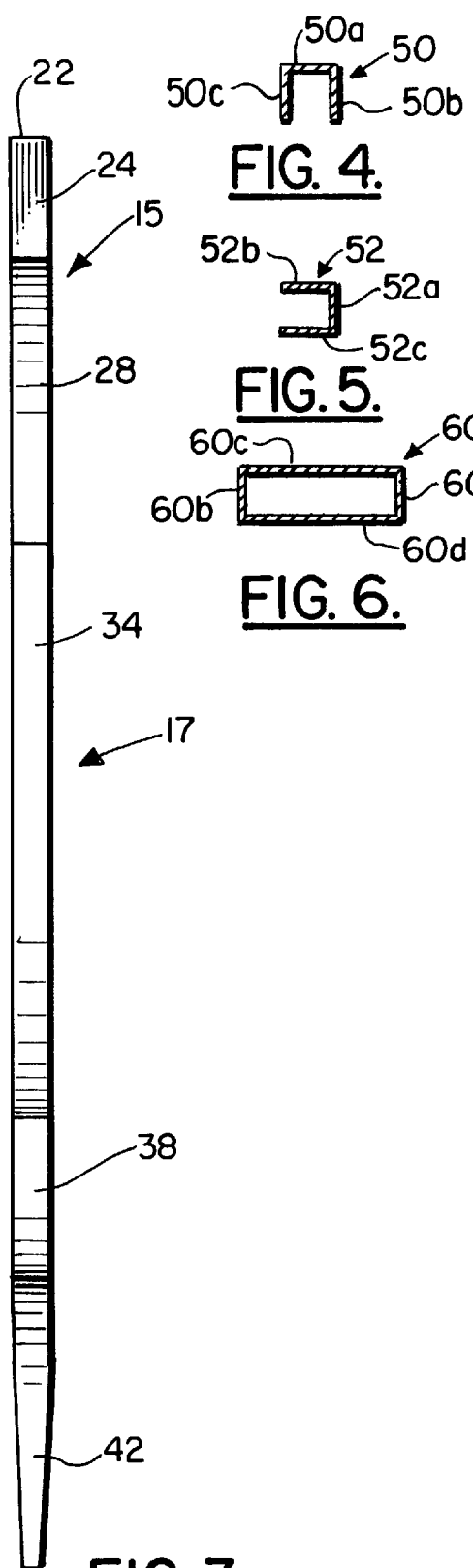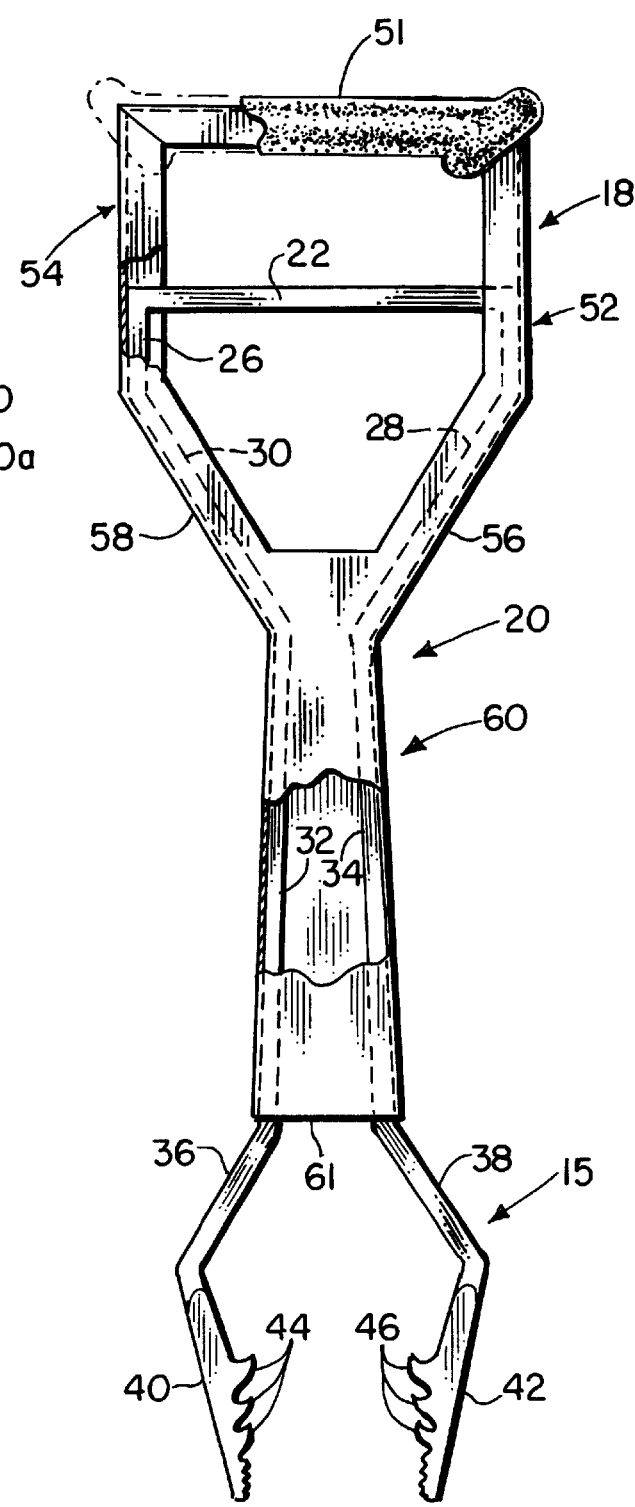

FISH HOLDER

BACKGROUND OF THE INVENTION

1. Field of the Invention

The present invention relates to apparatus for grasping and holding fish. In particular the invention relates to apparatus for grasping fish by insertion of a portion of the fish holder into the mouth of the fish.

2. Description of the Related Art

Sport fishermen encounter great difficulty in removing fish hooks from their catch. Fish are commonly picked up by the fisherman or an aid with a hand-held net as they approach the fisherman. After netting the fish, the fisherman or his aid must then remove the fish from the net and hold the fish in one hand while removing the hook from the mouth of the fish with the other hand. The body of the fish is slippery since it is coated with a protective slime coating, and the fish can easily slip out of the hand of the person removing a hook from the mouth of the fish. Fishermen frequently employ towels or rags to place over the body of the fish to prevent the fish from slipping from the hands of the fishermen. Gloves with rough outer surfaces are also employed by fishermen to hold the fish while removing the hook from the mouth of the fish.

When grasping the fish with the hand, utilizing a cloth or towel or a fish glove, removes the protective slime from the body of the fish. Such slime removal can cause the fish to die when placed back into the body of water from which it was caught.

Catching fish and releasing fish alive is a common practice in many areas of the United States. Such catch and release programs have proved valuable in maintaining fish populations.

Apparatus for holding fish are known in the art. Exemplary of the related art are U.S. Pat. Nos. 2,930,648; 3,208,786; 3,833,252; 3,978,605; 4,854,626; 5,577,785; and 5,832,651; and PCT WO84/03200.

SUMMARY OF THE INVENTION

In accordance with the present invention there is provided an apparatus for holding a fish including fish grasping tongs having jaws at the distal end thereof for placement on the inside and outside of the mouth of a fish, and a hollow case for slidably receiving the fish grasping tongs, the case being adapted to force the tongs to close together as the distal end of the tongs is drawn toward the case.

BRIEF DESCRIPTION OF THE DRAWINGS

FIG. 1 is a plan view of the fish holding tongs of the invention;

FIG. 2 is a plan view of a case for holding the tongs;

FIG. 3 is a side view of the fish holding tongs of FIG. 1 taken along lines 3—3 of FIG. 1;

FIG. 4 is a cross-sectional view of the case of FIG. 2 taken along lines 4—4 of FIG. 2;

FIG. 5 is a cross-sectional view taken along lines 5—5 of FIG. 2;

FIG. 6 is a cross-sectional view taken along lines 6—6 of FIG. 2;

FIG. 7 is a partly cut away, partly cross-sectional view of the fish holding tongs placed inside the case for holding the tongs;

DETAILED DESCRIPTION OF THE INVENTION

Figure 8:
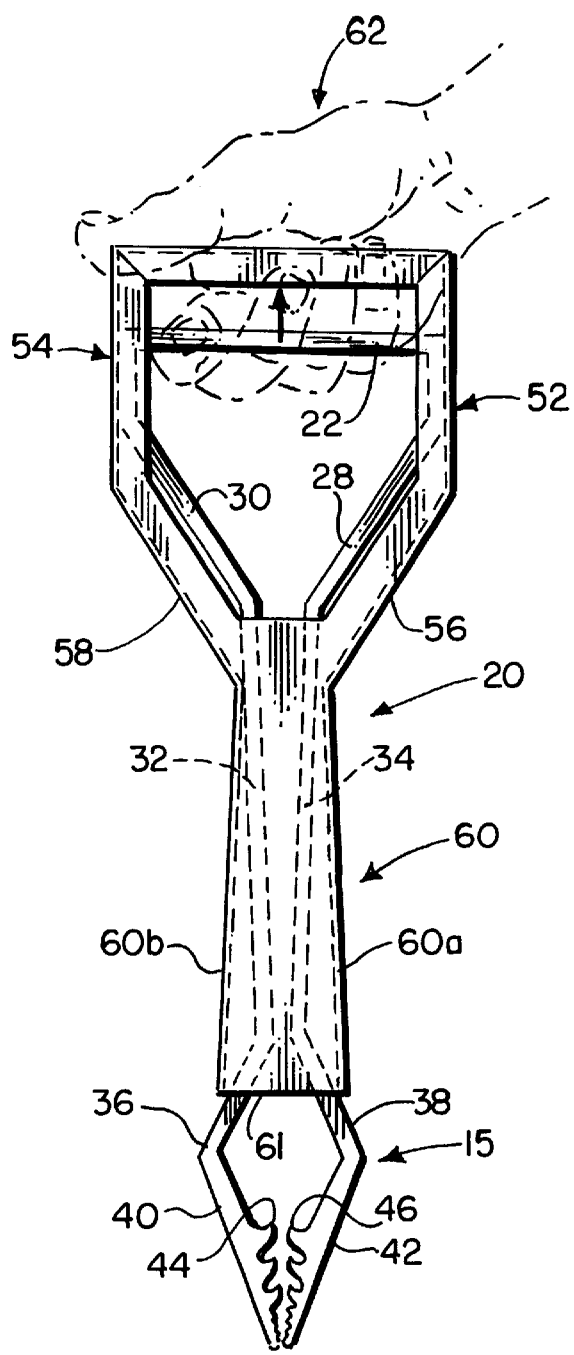
FIG. 8 is a plan view of the fish holder of the invention held by the user with the jaws of the fish holding tongs in the closed position.

Referring now to the drawings, and in particular to FIG. 1, the fish grasping tongs of the invention are generally indicated by the numeral 15, and in FIG. 2 is shown the case generally indicated by the numeral 18 for holding tongs 15. In FIG. 7 is shown the fish holder of the invention generally indicated by the numeral 20. Fish holder 20 includes fish tongs 15 slidably contained inside of case 18.

As shown in FIG. 1, fish grasping tongs 15 are made from a continuous piece of material such as metal or polymeric plastic material. Fish grasping tongs 15 include a horizontally disposed finger-grasping member 22 having two identical spaced-apart arms generally indicated by the numeral 17 and 19 extending downward therefrom and terminating in fish grasping jaws 40 and 42 at the distal end thereof Arms 17 and 19 begin with legs 24 and 26 extending downward from finger-grasping member 22 preferably at right angles thereto. Legs 24 and 26 are preferably equal in length.

Extending downward from leg 24 is transverse member 28 and extending downward from leg 26 is transverse member 30. Transverse member 28 is preferably identical to transverse member 30 in size and shape. Transverse member 30 forms an angle $\alpha$ with leg 26 of from about 145 to 155 degrees, or more preferably, about 149 degrees. Transverse member 28 forms the same angle $\alpha$ with leg 24.

Extending downward from transverse member 28 is elongated member 34, and extending downward from transverse member 30 is elongated member 32. Elongated member 32 is preferably identical to elongated member 34 in size and shape. Elongated member 32 forms an angle $\beta$ with transverse member 30 of about 140 to 150 degrees, or more preferably, about 146 degrees. Elongated member 34 forms the same angle $\beta$ with transverse member 28.

Elongated members 32 and 34 have jaw connecting members 36 and 38 connected thereto respectively. Jaw connecting member 36 forms an angle $\theta$ with elongated member 32 of about 145 to about 155 degrees, or more preferably about 150 degrees. Jaw connecting member 38 forms the same angle $\theta$ with elongated member 34.

Connected to jaw connecting member 36 and 38 at the distal end of fish grasping tongs 15 and at the end of arms 17 and 19 are fish grasping jaws 40 and 42. Fish grasping jaw 40 forms an angle $\lambda$ with jaw connecting member 36 of from about 140 to 150 degrees, or more preferably, 145 degrees. Fish grasping jaw 42 forms the same angle $\lambda$ with jaw connecting member 38. Located on the distal end of fish grasping jaws 40 and 42 are a plurality of inwardly curved teeth 44 and 46 which are used for grasping the inside and outside of the mouth of the fish 45 shown in FIG. 9.

As can be seen from the above description, fish grasping arm 17 of fish grasping tongs 15 includes leg 24, transverse member 28, elongated member 34, jaw connecting member 38, and fish grasping jaw 42, and fish grasping arm 19 of fish grasping tongs 15 includes leg 26, transverse member 30, elongated member 32, jaw connecting member 36, and fish grasping jaw 40.

Figure 9:
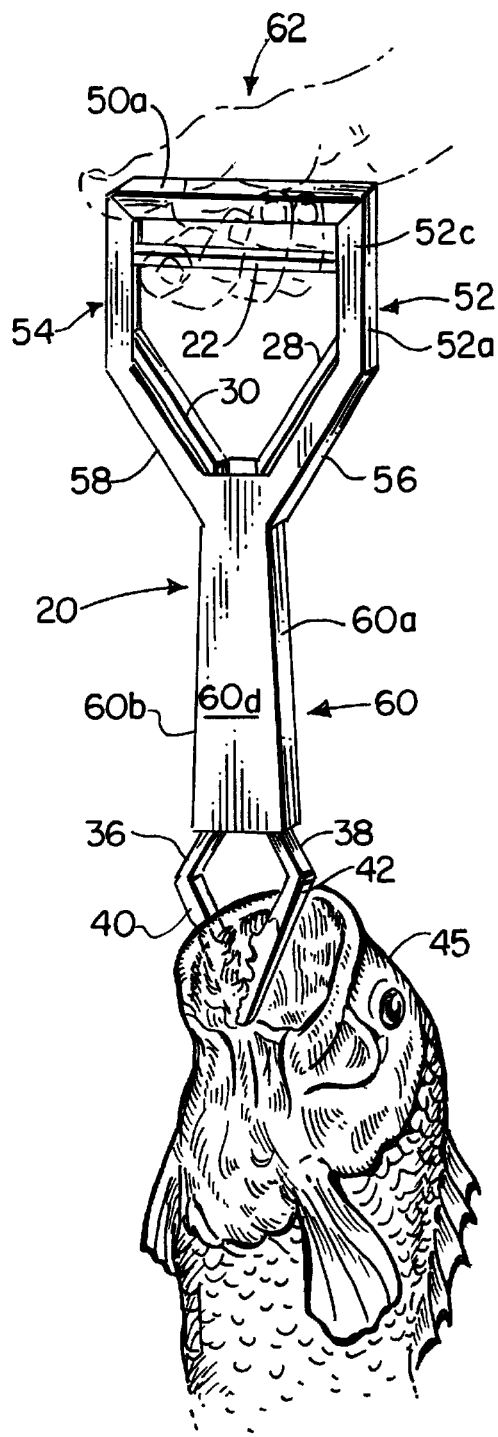
FIG. 9 is a perspective view of the fish holder of the invention held by the user while grasping a fish.

As can be seen in FIGS. 2 and 7, tong case 18 slidably contains fish grasping tongs 15 in the interior thereof and is shaped similarly to fish grasping tongs 15. Tong case 18 has a horizontally disposed handle portion generally indicated by the numeral 50 which preferably has a soft cover 51 thereon as shown in FIG. 7, although cover 51 may be omitted if desired as shown in FIGS. 8 and 9. Cover 51 may be constructed of rubber or other soft material known in the art.

As can be seen in FIG. 4, handle portion 50 has a flat generally rectangular top wall 50a, and two side walls 50b and 50c extending downward therefrom. Thus, handle portion 50 is generally U-shaped in cross-section and has an open bottom portion opposite top wall 50a between side wall 50b and 50c.

Extending downward from handle portion 50 are leg case members generally indicated by the numeral 52 and 54. Leg case members 52 and 54 are generally perpendicular to handle 50 and are spaced apart sufficiently to enable the fingers of an adult human hand 62 shown in FIGS. 8 and 9 to be inserted therebetween and to grasp finger-grasping member 22. Leg case members 52 and 54 are identical in size and shape. As shown in FIG. 5, leg case member 52 has a flat generally rectangular outer side wall 52a and two sidewalls 52b and 52c extending horizontally perpendicularly therefrom. Thus, leg case member 52 is generally U-shaped and has an open interior side portion opposite outer wall 52a between side walls 52b and 52c.

As can be seen in FIG. 7, finger-grasping member 22 and legs 26 and 24 are slidably contained in leg case members 52 and 54. Extending downward from leg case members 52 and 54 are transverse case members 56 and 58. Transverse case members 56 and 58 are U-shaped and contain transverse members 28 and 30 therein in the position shown in FIG. 7.

Extending downward from transverse case members 56 and 58 is elongated case member 60. As can be seen in FIG. 2, side walls 60a and 60b form an angle B with channel 56 and 58. Angle β is the same size as angle β shown in FIG. 1.

As shown in FIG. 6, elongated case member 60 has two parallel side walls 60a and 60b and two parallel side walls 60c and 60d connecting sidewalls 60a and 60b. The side walls 60a through 60d thus define a rectangular shaped channel for receipt of elongated members 32 and 34 when the fish grasping tongs 15 are in the position shown in FIG. 7. When fish holder 20 is in the rest position shown in FIG. 7 and is not in use grasping a fish, jaw connecting members 36 and 38 and extend out of the distal end 61 of elongated case member 60.

As shown in FIG. 8, to close jaws 40 and 42 together, the palm of the hand generally indicated by the numeral 62 of the user grasps handle portion 50 and the fingers of the hand 62 grasp finger-grasping member 22. As the fingers of the hand 62 are tightened upwardly as indicated by the arrow FIG. 8, elongated members 32 and 34, transverse members 28 and 30 withdraw into elongated case member 60. When jaw holders 36 and 38 strike the walls 60a and 60b, respectively, jaws 40 and 42 are forced together as shown in FIG. 8.

When fish grasping tongs 15 are in the position shown in FIG. 7, the jaws 40 and 42 are spread apart and jaw 42 or 40 maybe inserted into the mouth of a fish 65 as shown in FIG. 9. When finger-grasping member 22 is forced upwardly as shown in FIG. 9, the jaws 42 and 40 clamp on mouth of the fish 65 with one of the jaws being on the outside of the fish and one of the jaws being on the inside of the fish. The teeth 44 and 46 are forced together and tightly grip the side of mouth of fish 65.

Thus, utilizing the fish holder of the invention, a fish can be lifted from the water after being reeled to the side of a boat by sportsman with a rod and reel. It is not necessary to grab the back of the fish, and therefore protective slime is not removed. The fish can be held by the mouth with the fish holder 20 of the invention as shown in FIG. 9 without having to grasp the body of the fish, and the other hand can be used to dislodge a hook from the mouth of the fish. If desired, the fish can then be released into the water with minimum injury to the fish.

Although the fish holder 20 of the invention may be used with most game fish, the present invention is especially useful in catching red drum, commonly known in certain parts in the United States as redfish. A redfish has a relatively small, tough mouth, and removing hooks from the mouth of a redfish is difficult. Utilizing the fish holder 20 of the invention, redfish may be easily grasped with one hand while the fisherman removes the hook from the mouth of the redfish with the other hand. The redfish then can be thrown into the ice chest or other fish storage compartment or return to the water unharmed.

Figure 10:
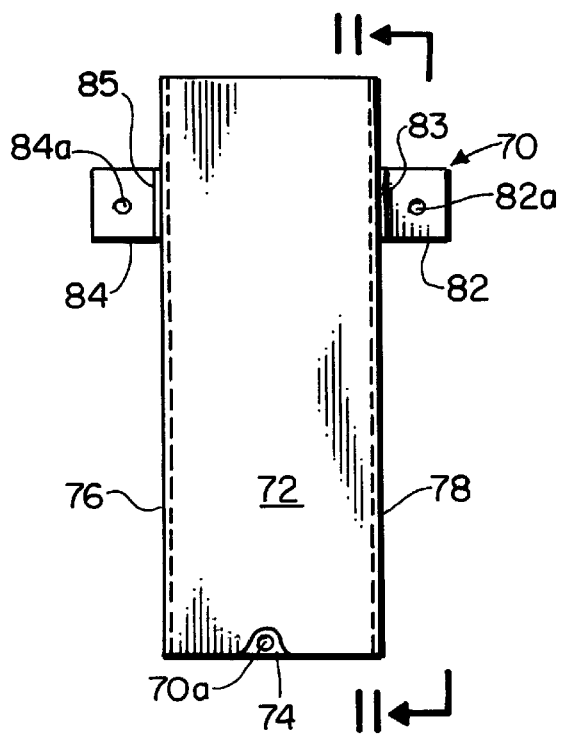
FIG. 10 is a plan view of a holster for holding the fish holder of the invention.
Figure 11:
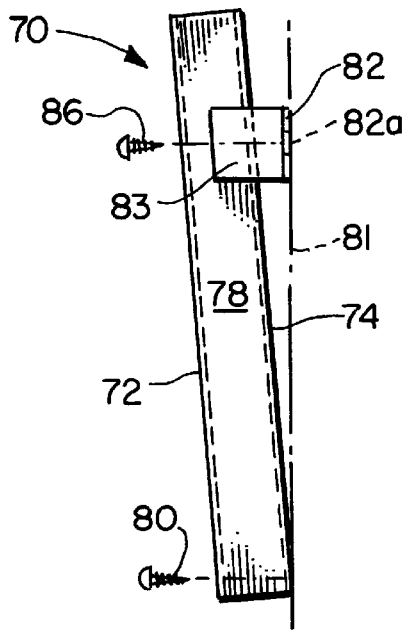
FIG. 11 a side view taken along lines 11—11 of FIG. 10.

In FIG. 10 is shown a holster for holding the fish holder of the invention which is generally indicated by the numeral 70. Holster 70 has a generally rectangular front side 72 and a parallel rectangular rear side 74, both of which are connected by two side walls 76 and 78. Thus side walls 72, 74, 76 and 78 form a holster for the fish holder of the invention having a rectangular cross-section. At the bottom center of side wall 74 of holster 70 is an opening 70a for a screw 80. Screw 80 is utilized to fasten the bottom of holster 70 to a solid member 81 such as the inside of boat.

Located at the top of holster 70 are two L-shaped brackets with arms 82 and 84 having holes 82a and 84a therein for receipt of screws 86. Arm 82 is connected to shoulder 83 and arm 84 is connected to shoulder 85. Shoulders 83 and 85 are connected to the side of holster 70. Holster 70 may be attached to the side a boat or other object 81 by placing screws 86 in 82a and 84a, and placing screw 80 in hole 70a.

Figure 12:
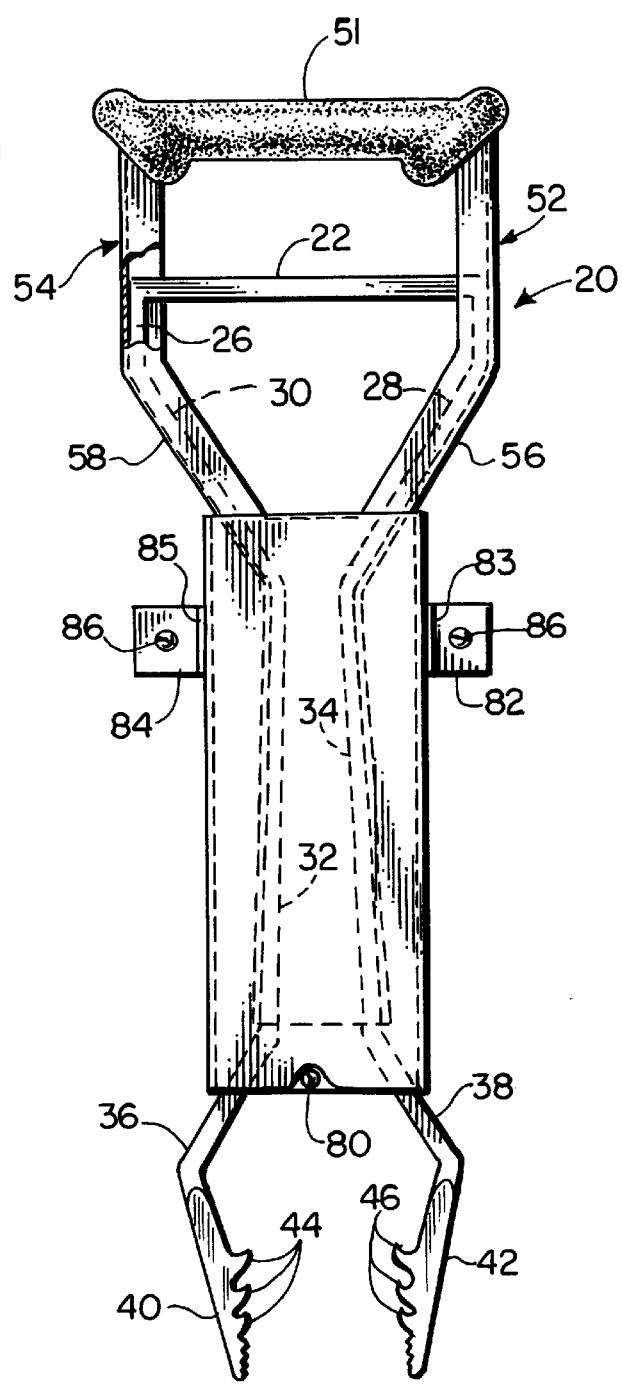
FIG. 12 is a partly cut-away view of the fish holder of the invention placed in the holster.

Preferably the components of the present invention are made from a metal or polymeric plastic material which are well known in the art. The material from which fish grasping tongs 15 are made should be sufficiently flexible or spring-like to enable arms 17 and 19 of fish grasping tongs 15 to be forced together as shown in FIG. 8 and to spring back to the position shown in FIGS. 1, 7, and 12. Exemplary of the metals that may be utilized are steel, aluminum and the like. Polymeric plastic material which may be utilized includes glass, fiber reinforced polymers which are well known in the art.

Although the preferred embodiments of the invention have been described in detail above, it should be understood that the invention is in no sense limited thereby, and its scope is to be determined by that of the following claims:

What is claimed is:

1. An apparatus for grasping and holding a fish with one hand of the user, the apparatus comprising:

a. one-piece fish grasping tongs having jaws at the distal end thereof for placement on the inside and outside of the mouth of a fish, said tongs having an elongated finger grasping member for grasping by the fingers of the user, said finger-grasping member having two arms extending perpendicularly therefrom, said two arms and said finger-grasping member lying in the same plane, said two arms being disposed on opposite ends of said finger-grasping member, and b. a hollow generally rectangular tong case slidably receiving said tongs therein, said case being adapted to force said tongs to close together as said finger-grasping member is grasped by the fingers of the user to draw said distal end of said tongs to said case, said case having an elongated handle oriented parallel to said finger-grasping member for receipt of the palm of said hand of the user, said finger-grasping member lying in the same plane as said elongated handle, wherein said tong case has an upper handle portion having hollow legs extending therefrom for slidably receiving said finger-grasping member therein.

2. The apparatus of claim 1 wherein said jaws are located on the distal end of said two arms.

3. The apparatus of claim 2 wherein said jaws have teeth on the inside thereof for grasping a fish.

4. The apparatus of claim 3 wherein each of said arms has one jaw thereon.

5. The apparatus of claim 1 wherein said arms each have an angular portion adjacent to the distal end thereof which extends beyond the distal end of said tong case when said apparatus for holding a fish is not in use grasping a fish.

6. The apparatus of claim 5 wherein said angular portion comprises jaw holder portions of said arms which is adjacent to said jaws.

7. The apparatus of claim 5 wherein said angular portion strikes said distal end of said case to force said arms toward each other when said tongs are forced upward farther into said case.

8. The apparatus of claim 1 wherein said tong case has a hollow elongated case member at the distal end of said case connected to said legs.

9. The apparatus of claim 1 wherein said apparatus is slidably received in a holster adapted for connection to a vertical structure.

* * * * *